Feb. 6, 1962 J. J. MARCH 3,019,850
PREFABRICATED INSULATED DUCT AND SOUND TRAP
Filed April 8, 1958 2 Sheets-Sheet 1
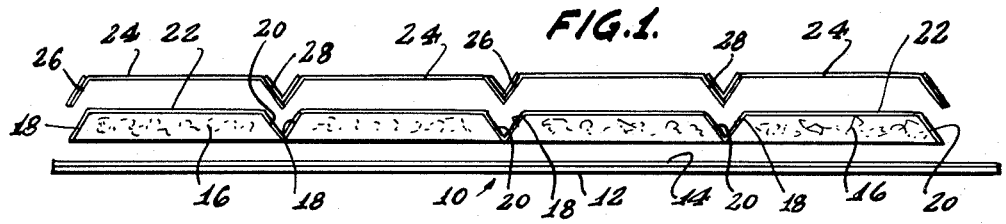
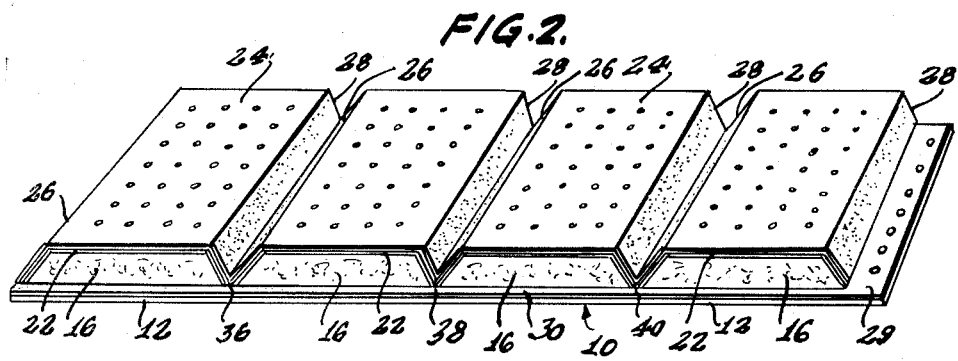
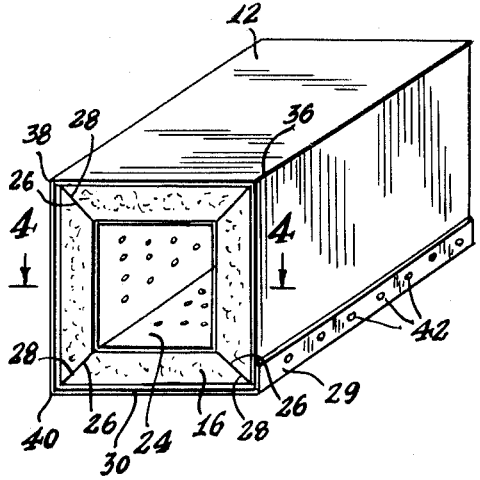
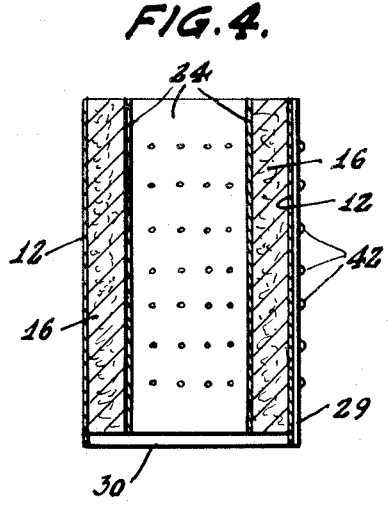
INVENTOR.
JOHN J. MARCH
BY
AGENT.

Feb. 6, 1962 J. J. MARCH 3,019,850
PREFABRICATED INSULATED DUCT AND SOUND TRAP
Filed April 8, 1958 2 Sheets-Sheet 2
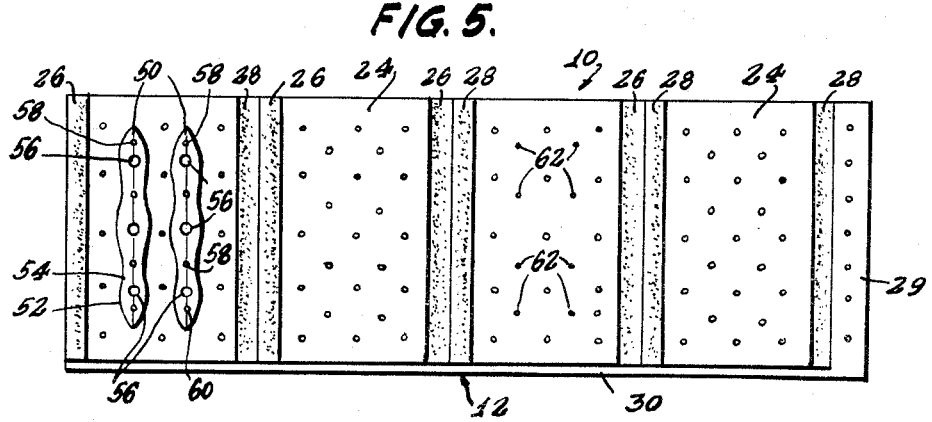
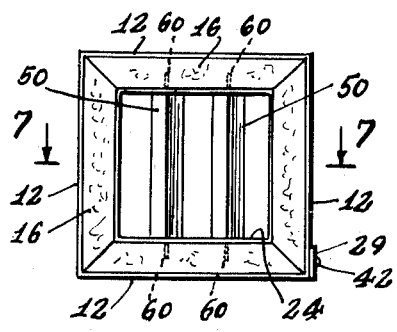
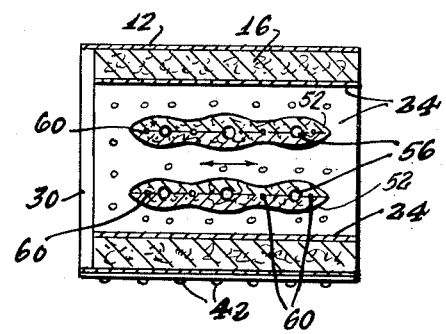
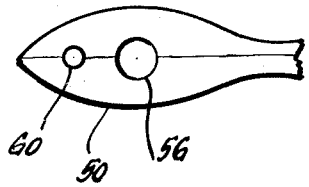
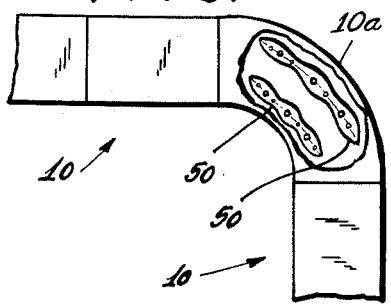
INVENTOR.
JOHN J. MARCH
BY James H. Conner
AGENT.

United States Patent Office 3,019,850
Patented Feb. 6, 1962

3,019,850
PREFABRICATED INSULATED DUCT AND
SOUND TRAP
John J. March, 54—18 43rd St., Maspeth, N.Y.
Filed Apr. 8, 1958, Ser. No. 727,219
2 Claims. (Cl. 181—42)

This invention relates generally to acoustical and thermally insulated ducts and in particular to a novel method of prefabricating an acoustical and thermally insulated duct.

Heretofore, air conditioning ducts were customarily formed of sheet metal and insulation was applied during or after the erection thereof. This on-the-job application of the insulating material required substantially skilled labor which was relatively expensive and time-consuming.

The present invention provides a composite prefabricated air-conducting duct having the insulation affixed thereto and which is manufactured in knocked-down or flat relation. This facilitates the shipping and transportation from the factory to the job site. Further, semi-skilled labor can readily form the prefabricated duct sections into a duct with a minimum of effort and a minimum of time. Accordingly, one of the principal objects of the invention resides in the provision of a method of manufacturing a composite duct hacing acoustical and thermal qualities that can be transported in flattened relation and which can be readily assembled into an air-conducting duct.

Still another object of the invention resides in the provision of novel steps in prefabricating the duct sections.

Yet another object of the invention resides in the provision of a novel air-conducting duct assembled of prefabricated sections.

It is highly desirable and often necessary in air conditioning systems to provide sound traps to reduce the undesirable noise level that is generally present in air ducts resulting from the flow of air there-through. Heretofore such sound traps have been difficult to install and have generally consisted of perforated metal sections that restrict the flow of air through the duct which effectively reduce the noise generated by the air flowing through the duct. However, these perforated metal traps have been difficult to design and required much engineering and factory assembly. Often the finished shape of the trap was not entirely satisfactory in reducing the noise level to a negligible degree and accordingly, the trap was considered ineffective. This condition necessitated the replacement and re-design of the trap which obviously added to the cost of the installation or remained in the air-conditioning system and of course did not materially reduce the objectionable noise. The present invention further provides a novel means of forming a sound trap that can be readily changed and which can be assembled on the job. Therefore, still a further object of the invention is to provide a novel prefabricated thermal and acoustical duct having means to form a sound trap.

And another object of the invention resides in the provision of a novelly constructed sound trap having relatively high sound absorption qualities.

Other ancillary objects will be, in part, hereinafter pointed out and will be, in part, hereinafter apparent.

In the drawings:

FIGURE 1 is an exploded end view of the component parts prior to the assembly of a duct section.

FIGURE 2 is an isometric projection of the duct section after it has been prefabricated and prior to its assembly into duct shape.

FIGURE 3 is an isometric projection of a duct section after it has been assembled.

FIGURE 4 is a cross-section taken along line 4—4 of FIGURE 3.

FIGURE 5 is a plan view of a duct section prior to its assembly illustrating the placement of the sound trap components.

FIGURE 6 is an end view of the assembled duct section with the sound trap components therein.

FIGURE 7 is a cross-section detail taken along line 7—7 of FIGURE 6.

FIGURE 8 is an enlarged detail shown in plan view of a portion of the sound trap components.

FIGURE 9 is a plan view of a portion of a duct system with the curved section cut away to show placement of the sound trap components in said curved portion.

Referring to the drawings in detail, 10 generally designates a section of duct prior to its assembly. The duct comprises a base 12 preferably formed of aluminum foil having a binding agent 14 applied to one surface thereof. The binding agent may be a conventional adhesive or one of the thermo-setting vinyl resin plastics. Applied to the adhesive 14 are four equally dimensioned mats 16 of glass fiber which are preformed to provide angular side portions 18 and 20. The upper periphery of the angular portions 18 and 20 and the mat 16 are also coated with an adhesive designated as 22 to which is applied a perforated steel frame 24. The steel frame 24 is complementarily formed with angular portions 26 and 28 and is compressed onto the glass fiber mats 16. The thermo-setting vinyl resin plastic adhesive is permitted to set and the duct section becomes substantially an integral member. It will be noted from FIGURE 2 that the outer foil 12 is of such dimensions to provide an end portion 29 which will be hereinafter described and a longitudinal marginal portion 30 also provided for a purpose hereinafter appearing. Further the angular portions 26 and 28 of the perforated metal liner 24 are coated on the outer periphery thereof with a coating of the thermo-setting vinyl plastic.

The assembled product is substantially complete and as noted in the drawing assumes a substantially flat relation. This is the manufactured product and accordingly, a plurality of the duct sections may be shipped in stacked relation while occupying a minimum of shipping space.

In final assembly wherein the section 10 is to be formed into the duct and connected to other sections, heat is applied to the thermo-setting plastic coating on the metal angular portions 26 and 28 and the foil 12 is bent to form a hinge at 36. The angular portions 26 and 28 then abut one another and the heated thermo-setting plastic flows therebetween effectively forming a joint. The same operation is repeated at the hinge portions 38 and 40 to form angular side walls of the duct. The extreme end portions 26 and 28 are similarly treated by heat and abutted one to the other. It may be noted that the heat required to melt the thermo-setting plastic may be provided by a conventional gasoline torch or propane gas torch, not shown. The end portion 29 of the aluminum foil 12 overlaps the opposite terminal edge of the foil and conventional fasteners 42 may be utilized to secure the flap portion in fixed relation. The thermo-setting plastic is permitted to air-dry, which is substantially rapid, and the section 10 is ready to be positioned in aligned relation with an adjacent section 10. In assembling one section with the other the longitudinal flap portion 30 is adapted to overlap the adjacent section 10. To facilitate the insertion of an adjacent section 10 within the flap 30, any one of many conventional methods, well known to those skilled in the art, may be utilized; such as, providing a peripheral taper in each section 10 or perhaps slotting the corners of the flap 30. The particular method is not important and the desired overlapping of flap 30 of one section 10 on an adjacent section 10 permits alignment of the sections in air-conducting relation. Conventional hanger brackets, not shown, are utilized to sustain the assembled duct in aligned air-conducting relation. Thus it will be obvious that there has been provided an extremely simple method of prefabricating an acoustical and thermal air-conducting duct.

The prefabricated duct is relatively light in weight and possesses great strength when compared with the conventional sheet metal ducts generally utilized today.

While the aforesaid duct is inherently acoustical in that a certain amount of noise attenuation is accomplished by the sound absorption of the material, it is often desirable that additional sound absorption means be provided. Accordingly, devices generally known as sound traps are enclosed in the duct work which substantially reduces the noise generated by the air passing through the ducts. The novel sound trap associated with the present invention generally comprises one or more uniquely formed members designated as 50 which are adapted to be positioned in the inside periphery of the duct section 10 prior to its angular bending into a rectangular duct section. The member 50 is formed in half sections of molded glass fiber to provide an external periphery having a predetermined shape. The molded glass fiber has integrally formed in the molding process on its periphery a glass fiber cloth 52 which is bound to a glass fiber mat filler 54 by the application of heat which when cured forms a substantially homogeneous mass. The particular shape of the member 50 is determined solely from the quantity of air passing through the duct 10. However, the particular shapes shown in FIGURE 5 possess inherent qualities that are important factors in sound attenuation. It will be noted that a plurality of hollow cylindrical chambers 56 are provided in each of the members 50 that permit or effectively act as resonating chambers. The relative thickness of the member 50 is further determined by the amount of attenuation that is desired. The glass fiber sound absorbing material provides a variable density throughout its length which permits a maximum sound absorption. Further the weight factor of a trap formed of this glass fiber material is greatly reduced when considered in the light of the conventional perforated metal sound traps. It may be stated that the molded halves of the member 50 are secured one to the other by means of the thermo-setting vinyl resin plastic. At the time of their molding there is also provided a plurality of transverse grooves 58 in which pins 60 are inserted after they are joined. The pins 60 are of substantially greater length than the width of the member 50 and thereby project from the top and bottom thereof. When it is desired to assemble a sound trap of this character a plurality of holes 62 are provided in opposite internal walls of a section 10 in aligned relation so that upon the angular assembly of the section 10 the pins 60 reside in the holes 62.

The inherent resiliency of the assembled members 50 readily permits said members to be inserted in an angular position of the duct such as shown in FIGURE 9. The corner duct 10a may be formed of one piece or may be formed of plural sections. The basic format for an angular position is not shown, however, it is readily apparent to anyone skilled in the art that the same method of prefabricated assembly hereinbefore described with pattern modifications could be utilized with differing dimensions to provide the assembled angular section.

Thus it is apparent that there has been provided a device in which the several objects of the invention are achieved and which is well adapted to meet the conditions of practical use.

While there has been shown and described a single embodiment of the invention, it is to be understood that modifications and changes might be made without departing from the scope of the present invention, except as limited by the claims.

The invention claimed is:

1. A prefabricated duct section having substantially rectangular shape comprising a plurality of equally dimensioned glass fiber sections having an outer coating of aluminum foil affixed thereto and an inner coating of perforated metal affixed thereto, plural angularly formed hinged portions provided in the perforated metal and the glass fiber mat, adhesive means disposed on said hinged portions to effectively seal said hinged portions as a unitary joint upon the angular assembly of the duct into substantially rectangular shape, sound attenuation means disposed between opposite side walls of the assembled duct, means extending beyond the upper and lower edges of the sound attenuation means adapted to be disposed within predetermined apertures in the opposite sidewalls to secure said sound attenuation means in predetermined relation in the assembled duct, and said sound attenuation means comprising glass fiber members discriminately shaped with hollow resonance chambers therein.

2. A prefabricated duct section having substantially rectangular shape comprising a plurality of equally dimensioned glass fiber sections having an outer coating of aluminum foil affixed thereto and an inner coating of perforated metal affixed thereto, plural angularly formed hinged portions provided in the perforated metal and the glass fiber mat, adhesive means disposed on said hinged portions to effectively seal said hinged portions as a unitary joint upon the angular assembly of the duct into substantially rectangular shape, sound attenuation means disposed between opposite side walls of the assembled duct, said sound attenuation means comprising glass fiber members discriminately shaped with hollow resonance chambers therein, and said glass fiber members being inherently flexible for disposition in curved relation in curved duct sections, plural pins extending beyond the upper and lower edges of said glass fiber members adapted to be disposed within predetermined apertures in the opposite side walls of the duct to secure said glass fiber members in predetermined relation in the assembled duct.

References Cited in the file of this patent

UNITED STATES PATENTS

| | | |
|---|---|---|
| 1,671,084 | Meyercord | May 22, 1928 |
| 1,711,471 | Curran | Apr. 30, 1929 |
| 1,865,677 | Cheyney | July 5, 1932 |
| 1,916,908 | Stacey et al. | July 4, 1933 |
| 2,056,608 | Jack | Oct. 6, 1936 |
| 2,489,048 | Rinehart | Nov. 22, 1949 |
| 2,759,556 | Baruch | Aug. 21, 1956 |

FOREIGN PATENTS

| | | |
|---|---|---|
| 831,314 | Germany | Feb. 11, 1952 |